United States Patent
Konno

(10) Patent No.: US 8,960,914 B2
(45) Date of Patent: Feb. 24, 2015

(54) LASER PROJECTION APPARATUS WITH SPECKLE REDUCTION

(75) Inventor: Kenji Konno, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 373 days.

(21) Appl. No.: 13/498,319

(22) PCT Filed: Sep. 14, 2010

(86) PCT No.: PCT/JP2010/065801
§ 371 (c)(1), (2), (4) Date: Mar. 26, 2012

(87) PCT Pub. No.: WO2011/037039
PCT Pub. Date: Mar. 31, 2011

(65) Prior Publication Data
US 2012/0182487 A1    Jul. 19, 2012

(30) Foreign Application Priority Data

Sep. 28, 2009  (JP) ................................ 2009-222172

(51) Int. Cl.
*G03B 21/14* (2006.01)
*G02F 1/1335* (2006.01)
(Continued)

(52) U.S. Cl.
CPC ............... *G02B 27/286* (2013.01); *G03B 21/14* (2013.01); *G02F 1/0136* (2013.01); *G02F 1/13* (2013.01); *G02F 1/01* (2013.01); *G02F 1/13362* (2013.01); *G02B 27/48* (2013.01); *H04N 9/3129* (2013.01)
USPC .......... 353/20; 353/94; 349/7; 349/9; 349/96; 349/194; 359/485.01; 359/298; 359/346

(58) Field of Classification Search
CPC .... G02B 27/286; G02B 26/10; H04N 9/3129; G03B 21/14; G02F 1/0136; G02F 1/13; G02F 2001/0136; G02F 1/01; G02F 1/13362
USPC ........................ 353/20, 94; 349/7, 9, 96, 194; 359/485.01, 298, 346
See application file for complete search history.

(56) References Cited

U.S. PATENT DOCUMENTS 6,154,259 A * 11/2000 Hargis et al. .................. 348/756
7,370,973 B2    5/2008 Sakaguchi et al.
2007/0153235 A1 * 7/2007 Morikawa et al. .............. 353/20

FOREIGN PATENT DOCUMENTS

JP        2006-47422       2/2006
WO     WO 2005/062114     7/2005

OTHER PUBLICATIONS

K. Konno et al., Laser Scan Ultra Compact Projector no Hikari Sekkei", Optics Design", No. 41, pp. 45-50, Apr. 10, 2009.

*Primary Examiner* — Toan Ton
*Assistant Examiner* — Magda Cruz
(74) *Attorney, Agent, or Firm* — Cozen O'Connor

(57) ABSTRACT

Provided is a laser projection apparatus which forms each one frame by performing two-dimensional scanning with laser light and projects images on a screen (201) with blanking periods inserted between frames, the laser light having been outputted from a laser light source (110). The laser projection apparatus is provided with a chive controlling device (132) which, in each of the blanking periods, changes the polarization state of the laser light having been outputted from the laser light source. This configuration enables speckle reduction by having the polarization state changed from one frame to another, and also enables favorable image projection since there is no change in luminance within each one of the frames. Thus, it is made possible to obtain image quality more favorable than that obtained conventionally.

16 Claims, 5 Drawing Sheets

(51) Int. Cl.
*G02F 1/13* (2006.01)
*G02B 5/30* (2006.01)
*H01S 3/00* (2006.01)
*G02B 27/28* (2006.01)
*G02F 1/01* (2006.01)
*G02B 27/48* (2006.01)
*H04N 9/31* (2006.01)

LASER PROJECTION APPARATUS WITH SPECKLE REDUCTION

This is a U.S. National Phase Application under 35 USC 371 of International Application PCT/JP2010/065801 filed on Sep. 14, 2010.

This application claims the priority of JP 2009-222172 filed Sep. 28, 2009, the entire content of which is hereby incorporated by reference.

TECHNICAL FIELD

The present invention relates to a laser projection apparatus which two-dimensionally deflects and scans a laser light beam to project an image.

BACKGROUND ART

In resent years, there have been proposed projectors which use a laser light source, and since they have a large color reproduction range compared to the conventional projector using a discharge lamp light source, they gather attention as a high quality image display device of the next generation. However, when a coherent light source such as a laser is used, diffraction of light generates a speckle, which is a high contrast spotty pattern. This pattern makes the projected image look as if it is floating and impairs the quality of the image. On the other hand, the speckle itself stems from using the laser, and thus it is difficult in principle to fully remove the speckle. Therefore, it is desired to reduce a speckle to be indistinctive instead of removing it.

The speckle stems from the coherency of the laser, and as a measure to reduce it there are proposed a method for lowering the coherency of the laser light beam and a method for normalizing the speckle by projecting temporally different speckle states.

On the other hand, it is known that the laser light beam is polarized in general and the state of speckle depends on the polarization state (see Patent Document 1). By using this knowledge, a speckle can be reduced by changing the polarization state of the laser light beam to change the speckle state, and superposing these temporally changing speckle states.

In Patent Document 1, for example, there is a polarization control section provided in the optical path between a laser light source and a scanning mirror, and a wave plate provided on the polarization control section is rotated, as the above-described method for changing the polarization state of the laser light beam, to temporally change the polarization state of the projected image. Thus, there is proposed a method for reducing the speckle by multiplexing the changing polarization states.

In Patent Document 2, there are defined regions in matrix, which regions transmit a laser beam therethrough, and in each of which regions a laser beam with different polarization state is generated; and in addition the polarization state is temporally changed to reduce the speckle.

RELATED ART DOCUMENT

Patent Document

Patent Document 1: Japanese Laid-Open Patent Application Publication No. 2006-47422
Patent Document 2: International Patent Publication No. 05/62114

SUMMARY OF THE INVENTION

Object of the Invention

However, in the case of reducing a speckle by changing the polarization state of the laser light beam for projecting an image, as described in Patent Documents 1 and 2, it is very important to project with whole the projection surface of the image in a uniform polarization state. To put it in other words, as described in Patent Document 1, if the polarization state is changed while projecting an image on a projection surface, that is to say, while generating a frame, the polarization state is different between different positions on the projection surface as shown in FIG. 5 of Patent Document 1. Thus, in the image projection apparatus of Patent Document 1, if an image is projected on a projection surface having a polarization dependency such as metal or a polarization maintaining screen, there is intensity distribution occurring on the projection surface, thereby deteriorating the quality of image. In addition, a mechanism for rotating the wave plate is needed, and the apparatus has issues of vibration, shock, noise, and durability.

In the invention of Patent Document 2, there are generated a plurality of polarization states in a plurality of sections formed in the same region through which a laser beam passes, whereby the beam gets to have diffuseness. That is to say, the beam has a larger spot diameter, losing the straightness of the beam, thereby deteriorating the resolution and losing a feature to be focus free.

The present invention is made to solve the aforementioned problems, and an object is to provide a laser projection apparatus in which a higher image quality is provided compared to that with conventional arts and which has a configuration for changing the polarization state of light to reduce a speckle.

Means for Solving the Object

To accomplish the above-described object, the present invention has a configuration as follows.

That is, a laser projection apparatus according to a first aspect of the present invention comprises: a laser light source configured to generate a laser light beam and modulate the laser light beam; a scan mechanism configured to two-dimensionally scan the laser light beam emitted from the laser light source so as to form a frame to project an image on a screen with a blanking period between each of the frames, and a polarization conversion section configured to differentiate polarization states of light beam emitted from the laser light source and emit the light beam toward the screen; and further a drive control device configured not to change the polarization state while forming the frame and to cause the polarization conversion section to operated to differentiate the polarization state during the blanking period.

Further, the polarization conversion section may be configured to include a liquid crystal element for forming a single-polarization state in a region where the laser light beam passes through.

Further, the liquid crystal of the liquid crystal element may be a smectic liquid crystal or a ferroelectric liquid crystal.

Further, the laser projection apparatus may satisfy the following conditional expression:

$$0.1 < \text{blanking period (sec)} \times \text{frame frequency (Hz)} < 0.4.$$

Further, the polarization conversion section may be disposed between the laser light source and the scan mechanism.

Further, the polarization conversion section may be provided at a light emission window disposed between the scan mechanism and the screen.

Further, the polarization states differentiated by the polarization conversion section may be perpendicular to each other.

Further, the laser projection apparatus may comprise a plurality of laser light sources configured to emit laser light beams which have a different wavelength, as the laser light source; and an optical system configured to combine the laser light beams from the plurality of laser light sources.

Further, the plurality of laser light sources each may generate three laser light beams of blue light, green light, and red light, and the polarization conversion section converts polarization such that the laser light beam of the green light or the red light has polarization states perpendicular to each other.

Further, the polarization conversion section may be disposed between the optical system and the scan mechanism.

Advantage of the Invention

According to the laser projection apparatus of the first embodiment comprises the polarization conversion section for changing the polarization state of light; and a blanking period, between frames, to project an image, wherein the apparatus comprises a drive control device to cause the polarization conversion section to operate in the blanking periods. The blanking period corresponds to an image, in other words, a switching time for one frame, and thus, by changing the polarization state in the polarization conversion section in the blanking period, the image is projected in the same polarization state within one frame. Thus, in the laser projection apparatus according to the above-described first aspect, the polarization state changes between frames, and whereby the states of speckle are different; and thus those states are multiplexed to reduce the speckle, and there is no change in brightness within one frame, thereby providing an excellent image projection. Therefor; there is provided an image quality higher than before.

In addition, since the laser projection apparatus according to the first embodiment is a scanning type, it has another advantage that it can be made smaller and made to consume less power.

BEST MODE FOR CARRYING OUT THE INVENTION

Figure 1:
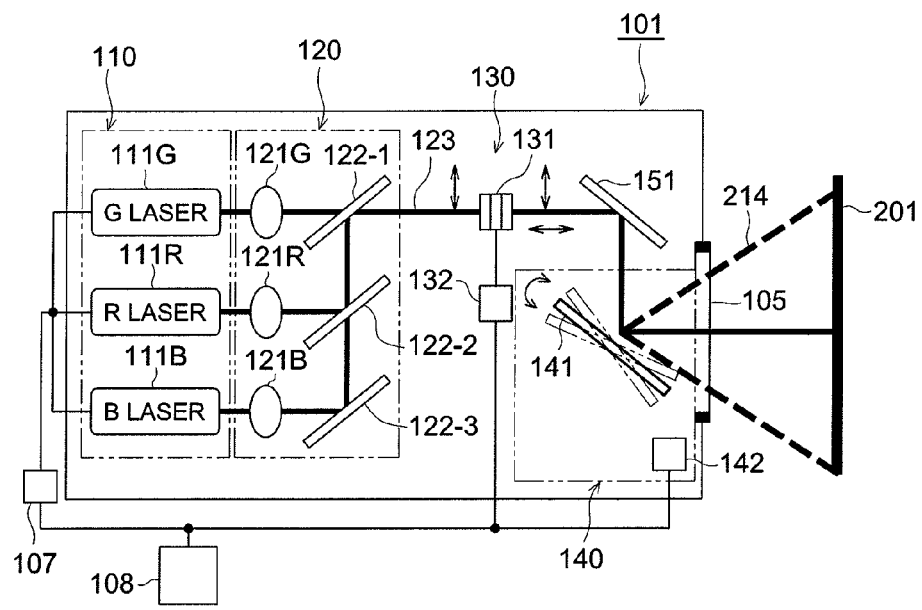
FIG. 1 is a diagram showing a configuration of a laser projection apparatus according to an embodiment of the present invention.

An embodiment of the laser projection apparatus of the present invention is described below with reference to drawings. In the drawings, the same or a similar component is assigned with the same reference numeral.

A laser scanning projector which gathers attention as a super small projector comprises a laser light source and a scanning section for two-dimensionally scanning the laser light beam on a screen, in other words it scans the modulated laser light beam containing image information by using the scanning section so as to project an image. On the other hand, there is another method for a projector in which a two-dimensional spatial modulation element such as a liquid crystal panel or a DMD (Digital Micromirror Device) is illuminated, and thus the modulated image is projected through a projection lens. Compared to the latter method, the above-described laser scanning projector has an advantage that it does not need a projection lens, and thus it can be miniaturized, and in addition, the power consumption can be reduced since the laser light source is directly modulated and whereby the laser needs not to emit light for a dark image, for example.

An laser projection apparatus 101 of the embodiment shown in FIG. 1 corresponds to such laser scanning projector, and has a configuration in which a speckle is reduced by generating the above-described temporally changing speckles. First, the action of reducing a speckle in the laser projection apparatus 101 having such configuration is generally described below.

The laser projection apparatus 101 of the embodiment employs a raster scan method to project a laser light beam on a screen. A raster type is a method in which a scanning line is drawn from the top to the bottom of the screen or in its opposite direction by combining a first direction (main-scanning direction) scanned at a high speed and the second direction (sub-scanning direction) scanned in a speed slower than the first direction. Thus, in the raster type, a plurality of main scans are performed while scanning single sub-scan. For that reason, there is a period, corresponding to the change of the scanning direction, called a blanking in which the laser is not emitted and an image is not displayed. In addition, the blanking time corresponds to: a time for moving from one horizontal direction (corresponding to the first direction) to another horizontal direction within one frame; and a time for moving from one frame to another frame. In this embodiment, the blanking time refers to the latter blanking time. Accordingly, the blanking time corresponds to a switching time between images, and exists every drawing of an image of one frame.

In this embodiment, in order to change the polarization state of the laser light beam frame by frame, the polarization state of the laser light beam is changed during the blanking time. In this manner, an image within one frame is projected in the same polarization state; and between each frame, the polarization states are changing and the state of the speckle is different. Consequently, those speckles are multiplexed and thereby reducing the speckle, and since there is no change in brightness within one frame, an excellent image can be projected.

Based on the general action above, the laser projection apparatus 101 is specifically described in below.

The laser projection apparatus 101 is provided as basic components a laser light source 110; an optical system 120 for combining laser light beam from the laser light source 110; a polarization conversion section 130; a scan mechanism 140 for reflecting the laser light beam emerging from the optical system 120 on a reflection section 141 and two-dimensionally scanning the light on a screen 201. Those components are described in detail below. Further, in order to cause the laser projection apparatus 101 to display an image on the screen 201, an image processing circuit 108 for performing the operation control of the laser projection apparatus 101 is connected to the laser projection apparatus 101. Alternatively, the laser projection apparatus 101 may include an image processing circuit 108.

The laser light source 110 is provided with a laser element 111G to generate G (green) light, a laser element 111R to generate R (red) light, and a laser element 111B to generate B (blue) light. The laser element 111G is constituted by a semi-conductor-excited solid-state laser for generating light with a wavelength of 532 nm by using a second harmonic generated in a PPLN waveguide, for example. The laser element 111R is constituted by a semiconductor laser for generating light with a wavelength of 630 nm. The laser element 111B is constituted by a semiconductor laser for generating light with a wavelength of 445 nm.

For the laser element 111R and the laser element 111B, an injection current to the laser chip may be directly modulated, or an optical modulator such as an AO (acoustic optical) device may be separately provided. For the laser element 111G, an injection current to a laser chip for excitation may be directly modulated, or an optical modulator such as an AO device may be separately provided. In the case of using a direct current modulation for modulating the current, it is preferable to superpose a high frequency current on the current.

For the laser element 111G, the laser element 111R, and the laser element 111B, the above-described modulation is controlled by a laser drive circuit 107. Although the laser projection apparatus 101 is separately provided with the laser drive circuit 107 as shown in FIG. 1, the laser projection apparatus 101 may instead include the laser drive circuit 107 therein.

The optical system 120 is provided with a collimator lenses 121G, 121R, and 121B corresponding to the laser elements 111G, 111R, and 111B, respectively, and provided with dichroic mirrors 122-1, 122-2, and 122-3 corresponding to the collimator lenses 121G, 121R, and 121B, respectively The collimator lenses 121G, 121R, and 121B have an NA (numerical aperture) of 0.4 and a focal length of 4 mm, for example, and the laser light beam passes through the lens and is collimated to have a beam diameter of 3.2 mm.

The dichroic mirror 122-3 is a mirror to reflect the B (blue) laser light beam which has been generated by the laser element 111B and has been collimated by passing through the collimator lens 121B. The dichroic mirror 122-2 is a mirror to allow the B (blue) laser light beam to pass through and reflects the R (red) laser light beam which has been generated by the laser element 111R and has been collimated by passing through the collimator lens 121R. Consequently, the dichroic mirror 122-2 combines the B (blue) laser light beam and the R (red) laser light beam and emits them. The dichroic mirror 122-1 is a mirror to combine the B (blue) laser light beam, R (red) laser light beam, and the G (green) laser light beam which has been generated by the laser element 111G and has been collimated by passing through the collimator lens 121G, and emits them as a white laser light beam 123.

The combined white laser light beam 123 is linearly polarized.

The laser elements 111G, the laser element 111R, and laser element 111B and the collimator lenses 121G, 121R, and 121B and the dichroic minors 122-1, 122-2, and 122-3 may be separately provided or may be may integrally provided as a laser light source unit.

The scan mechanism 140 is a mechanism which is configured to two-dimensionally scan the laser light beam on the screen 201, and is provided with a reflection section 141 made up of a mirror to reflect the laser light beam 123 having emerged from the optical system 120 as a scanning light beam 214, and is provided with a drive section 142 to drive the reflection section 141 to cause the scanning light beam 214 to scan the screen 201. The scan mechanism 140 may be separately provided with a main-scanning minor and a sub-scanning mirror, or may be provided with a single mirror on which a main scan drive mechanism and a sub-scan drive mechanism are provided. In this embodiment, the scan mechanism 140 is constituted by a MEMS mirror mechanism which is provided with a scanning minor to be vibrated by a piezoelectric element in a horizontal direction and a vertical direction.

The drive section 142 of the scan mechanism 140 is described in more detail.

In this embodiment, the drive section 142 drives the reflection section 141 to scan the screen 201 with the scanning light beam 214 in a so-called raster type manner. The reflection section 141 is inclined, between +6 degrees and −6 degrees as a practical example, in the vertical direction (sub-scanning direction) perpendicular to the horizontal direction (main-scanning direction) on the screen 201, and the inclination angle is temporally changed. With this arrangement, the scanning light beam 214 is scanned from the upper left end of the screen 201 to the lower right end, repeating the scan in the horizontal direction and in the vertical direction, and goes back to the upper left end. The temporal change in the inclination angle of the reflection section 141 in the vertical direction is shown as a saw-tooth waveform 143 in the graph of FIG. 2

Figure 2:
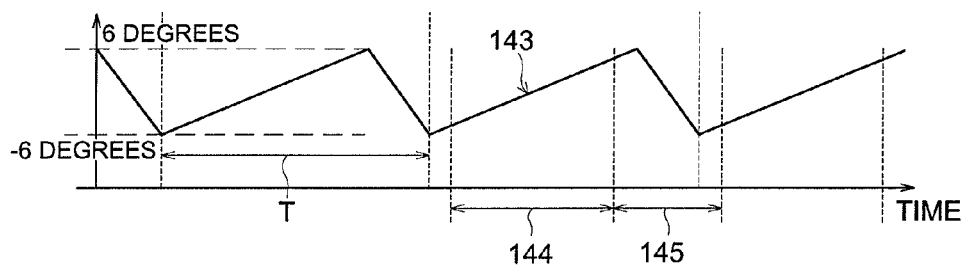
FIG. 2 is a timing chart of an example of an operation control for a scan mechanism provided in the laser projection apparatus shown in FIG. 1.

On the other hand, in this embodiment, the frame frequency is 60 Hz, and the time for one frame is about 16.7 ms. That is, one cycle T of the saw-tooth waveform 143 shown in FIG. 2 is 16.7 ms. In addition, in this embodiment, the portion of 70% of one cycle T is the image display period 144, in other words, the scanning period from the upper left end to the lower right end, and the rest of 30% corresponds to the so-called blanking period 145 and is 5 ms in the embodiment. In the operation of the reflection section 141, the blanking period 145 corresponds to a predetermined period including the time for the scanning light beam 214 to return from the lower right end to the upper left end as shown in FIG. 2 and the time of starting and ending the inclination drive.

Figure 9:
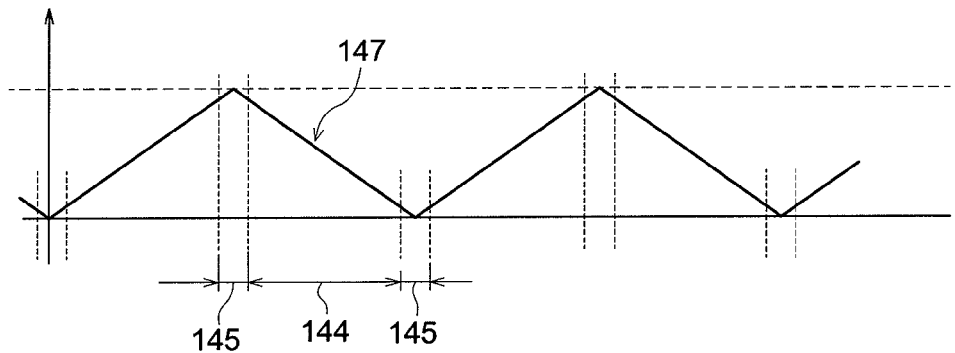
FIG. 9 is a timing chart showing an example of modification of a scan mechanism of the operation control provided in the shown in FIG. 1.

Further, the operation of the drive section 142 for the reflection section 141 is not restricted to the operation according to the saw-tooth waveform 143, and has only to include the blanking period 145. For example, it may be an operation in which the screen 201 is scanned from the upper left end to the lower right end, and is then reversely scanned from the lower right end to the upper left end according to the triangular waveform 147, as shown in FIG. 9. In the triangular waveform 147, the image display period 144 and the blanking period 145 is shown in the drawing.

Next, the polarization conversion section 130 is described.

The polarization conversion section 130 is one of featured components of the laser projection apparatus 101 of the embodiment, and is provided between the optical system 120 and the scan mechanism 140 to change the polarization state of the laser light beam 123 emerging from the optical system 120 and to emit it to the scan mechanism 140, as shown in FIG. 1, in the embodiment. The polarization conversion section 130 is provided with a drive control device 132 as a basic component, and is provided, in the embodiment, with a liquid crystal element 131 which is controlled by the drive control device 132 and through which the laser light beam 123 having emerged from the optical system 120 passes.

The liquid crystal element 131 is basically has a transparent liquid crystal material sandwiched between two transparent substrates; on each of the liquid crystal material side surface of the substrates is a transparent electrode for applying a voltage to the liquid crystal material; and in the inner side of each transparent electrode is an alignment film. The liquid crystal element 131 constituted as described above allows the laser light beam 123 emerged from the optical system 120 to pass therethrough, and changes the polarization state of the laser light beam 123 passing therethrough by the change, in the alignment state of the liquid crystal material, caused by the drive control device 132.

Figure 4:
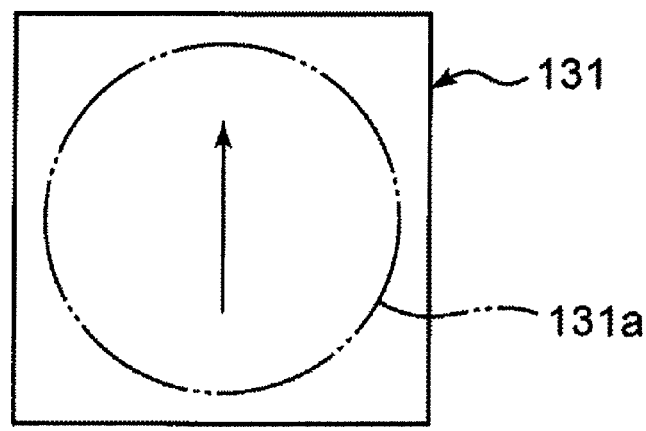
FIG. 4 is a plan view of the liquid crystal element provided in the laser projection apparatus shown in FIG. 1.

In order to change the whole of the polarization state of the laser light beam 123, the liquid crystal element 131 has a single pixel. In particular, when the liquid crystal element 131 has a square shape as shown in FIG. 4, for example, the transparent electrode is made square. With the liquid crystal element 131 constituted as described above, the polarization state of the passing laser light beam 123 is uniform independently of passing positions in a transmissive region 131a (see FIG. 4), in which the laser light beam 123 passes, of the liquid crystal element 131, that is to say, single. In other words, the liquid crystal element 131 generates only one polarization state in the transmissive region 131a for the laser light beam 123, and it does not generate a plurality of polarization state as described in Patent Document 2.

The liquid crystal element 131 for generating a single-polarization state does not affect the quality of the light beam, whereby the resolution of the projected image is not lowered, while the liquid crystal element having a plurality of pixels generate a problem of an effect of the diffraction due to the electrodes and a problem of the lowering of the resolution of the projected image due to the deterioration of the straightness of the light beam.

In view of the operation control, to be described below, performed by the drive control device 132, the liquid crystal material included in the liquid crystal element 131 is preferably made of a smectic liquid crystal material or a ferroelectric liquid crystal material both having a relatively shorter response time than a generally used TN liquid crystal material. In addition, these liquid crystal materials change the polarization state by birefringence instead of optical rotation in TN liquid crystal material. When the ferroelectric liquid crystal is used as the liquid crystal material, the molecular arrangement is changed toward the vertical direction with respect to the voltage application direction by a small extent, depending on the presence or absence of the application of voltage to the liquid crystal element, and the thereby caused change in the birefringence generates the phase difference, whereby the polarization state of the entering beam can be changed. When the phase difference is π, for example, the polarization direction is changed by 90 degrees. An appropriate adjustment of the thickness of the liquid crystal element, the liquid crystal material, and the orientation of the molecular arrangement can appropriately control the amount of change in birefringence. In the case of the liquid crystal element 131 used in the embodiment, the parameters of the liquid crystal element 131 can be set so that the polarization of the entering light is changed between two polarization states perpendicular to each other, depending on the presence or absence of the apply voltage. As a result, the adjustment between the entering polarization state of the laser light beam and the axis of the liquid crystal material can be done easier than the TN liquid crystal, which fact is preferable. In addition, the polarization conversion including birefringence can be used for a circularly polarized entering light and the axis of the liquid crystal material can be arbitrarily set in that case, and which fact is preferable.

Further, as a device for changing the polarization state, instead of the liquid crystal element 131, an optical crystal, in which the amount of birefringence can be changed depending on the applied voltage, such as PLZT (Lead lanthanum titanium zirconium oxide) can be used, for example.

The drive control device 132 for driving the liquid crystal element 131 configured as shown above is described.

The drive control device 132 causes the liquid crystal element 131 to operate during the blanking period 145 so as to change the polarization state of the laser light beam 123 emerging from the optical system 120. In this embodiment, the laser light beam 123 is linearly polarized, and the drive control device 132 applies a voltage to the liquid crystal element 131 so as to change the alignment direction of the liquid crystal material, thereby changing the birefringence, whereby the linearly polarized light is converted in the direction different from its original direction by 90 degrees, that is to say, in the polarization state in the perpendicular direction. In addition, the term "perpendicular" above means two states extremely opposed to each other when the polarization states are shown on the Poincare sphere. The conversion of the polarization state of the laser light beam 123 performed by the drive control device 132 is not restricted to the above-mentioned perpendicular direction, and can be in a direction altered by 45 degrees, for example. In a method like the embodiment, in which the polarization state is changed by using birefringence, the polarization conversion property can be changed by controlling the drive voltage or the direction of the liquid crystal. The conversion in the perpendicular direction is the most preferable because the correlation between speckle patterns can be set in the most different state, and thereby most effectively reducing the speckle.

The drive control of the liquid crystal element 131 by the drive control device 132 is described.

Figure 3A:
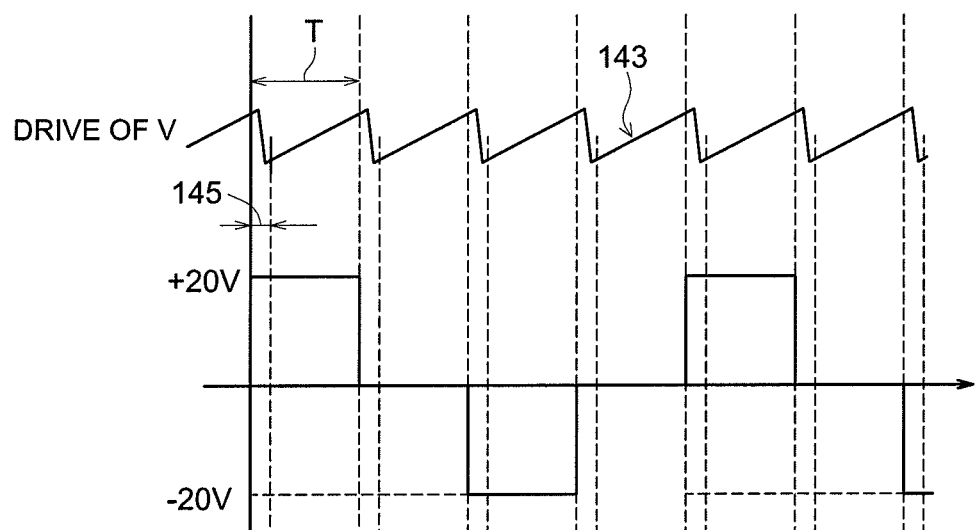
FIGS. 3a and 3b are timing charts showing an example of a control performed by a drive control device provided in the laser projection apparatus shown in FIG. 1, and a graph showing an operation state of a liquid crystal element driven by the control.

As described in the general description, the drive control device 132 applies a voltage to the liquid crystal element 131 to change the orientation of the liquid crystal material during the blanking period 145 of the projection on the screen 201. In concrete terms, as shown in FIG. 3a, the drive control device 132 changes the voltage applied to the liquid crystal element 131 at the same time as the start of the blanking period 145, and holds the voltage until the start of the next blanking period 145. The period to hold the voltage, in this embodiment, corresponds to the one cycle T of the saw-tooth waveform 143. Thus, the polarization state of the scanning light beam 214 does not change during the image display period 144. By applying to the liquid crystal element 131 a voltage of positive, 0, negative, 0, positive, in series, as shown in FIG. 3a, the polarization state of the laser light beam 123 passing through the liquid crystal element 131 is changing in the perpendicular directions to each other, for example, vertical (horizontal), horizontal (vertical), vertical (horizontal), in series.

The purpose of applying a positive voltage and a negative voltage alternately in FIG. 3a, is to normalize the polarization possibly caused by the liquid crystal drive. The effect of the drive is the same between a positive voltage and a negative voltage.

Figure 3B:
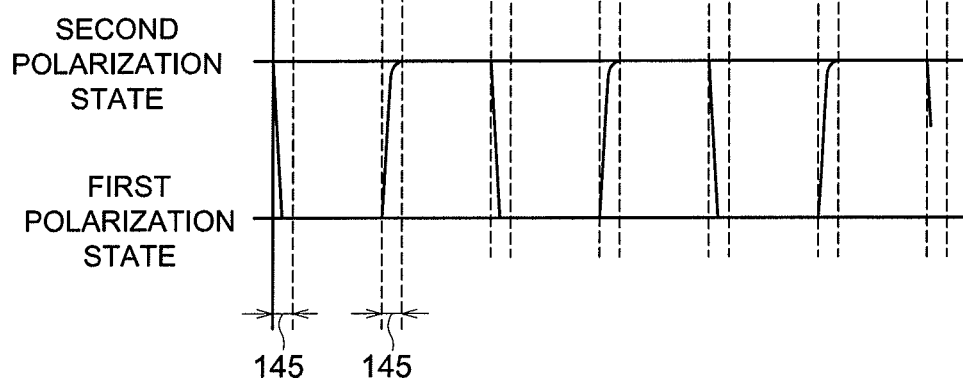

FIG. 3b is a diagram of a general temporal change of the response of the liquid crystal material caused by the change in the drive voltage shown in FIG. 3a, when a smectic liquid crystal is used as the liquid crystal material of the liquid crystal element 131. As described above, in this embodiment, the magnitude of the birefringence need to be changed during the blanking period 145 by changing the orientation of the liquid crystal material of the liquid crystal element 131. Therefore, the liquid crystal material is required to have a response of 5 ms or less, in this embodiment. Further, the liquid crystal material has a slower response when applied (referred to as "rising") with a positive voltage or a negative voltage than when returning (falling) to 0 V.

In this embodiment, when a smectic liquid crystal or a ferroelectric liquid crystal is used for the liquid crystal element 131, the change in the state of orientation of the liquid crystal material of the liquid crystal element 131 can be changed during the blanking period 145, that is in 5 ms, not only at the "rising" but also at the "falling."

As described above, in this embodiment, the orientation of the linear polarization of the scanning light beam 214 can be changed by 90 degrees in the blanking period 145 in which an image is not displayed, and the polarization state of the scanning light beam 214 is not changed in the image display period 144.

Thus, with the laser projection apparatus 101 of the embodiment, even if the laser light beam is projected on a polarization dependent screen, the image is uniform in brightness, thereby preventing the resolution of the projected image from decreasing.

In this embodiment, the polarization conversion section 130 has the liquid crystal element 131 as described above, but a phase plate or a polarization rotation element can be used instead of the liquid crystal element 131. In either way, the polarization state can be controlled by the drive control device 132 in the blanking period 145.

However, when the phase plate, which has a mechanical drive mechanism, is used, wear, noises, vibration, and the effect of shock can be worried. Accordingly, the liquid crystal element 131, which has no mechanical drive mechanism, is advantageous. Further, the liquid crystal material is preferably used because it has relatively large molecules aligned, whereby a small amount of diffusion caused by the liquid crystal structure itself contributes to the reduction of speckles, which is extra effect in addition to the effect of the multiplexing of polarization.

The laser projection apparatus 101 of the embodiment, which is constituted as described above, is described below.

The laser light beams each generated and modulated by the laser elements 111G, 111R, and 111B are each collimated by the collimator lenses 121G, 121R, and 121B, and are then combined by the dichroic mirrors 122-1, 122-2, and 122-3 to be the laser light beam 123, which enters into the liquid crystal element 131 of the polarization conversion section 130. Here, the polarization state of the laser light beam 123 is assumed to be in the vertical direction (see FIG. 1), for example. The laser light beam 123 having entered into the liquid crystal element 131 passes through the liquid crystal element 131 and is applied to the reflection section 141 of the scan mechanism 140 by way of the mirror 151. In this arrangement, the polarization state of the laser light beam 123 is converted into the vertical direction or into the horizontal direction perpendicular to this direction by passing through the liquid crystal element 131, depending on the orientation of the liquid crystal material. In this embodiment, the laser light beam 123 is linearly polarized before and after passing through the liquid crystal element 131. But the direction of the linear polarization is changed as described above The mirror 151 is used to adjust the optical path so as to lead the laser light beam 123 having passed through the liquid crystal element 131 to the scan mechanism 140, and it is not required in some device configurations.

The laser light beam applied to the reflection section 141 is scanned in the horizontal direction and the vertical direction with respect to the screen 201 by the reflection section 141 driven by the drive section 142 of the scan mechanism. By this operation, an image of one frame is projected on the screen 201.

In this operation, the display of an input image on the screen 201 is performed by the operation in which the image processing circuit 108 drives, based on the input image data, the laser drive circuit 107 and the drive section 142 of the scan mechanism 140 in synchronism.

At the start of blanking period 145 after the completion of display of one frame of image, the drive control device 132 of the polarization conversion section 130 applies a voltage of some amount or zero. This application of the voltage causes the direction of the linear polarization of the light beam 123 passing through the liquid crystal element 131 to be different from that of the previous frame by 90 degrees. As described above, the laser light source 110 does not generate a laser light beam during the blanking period 145.

After the blanking period 145, the laser light source 110 generates a laser light beam again, and the scanning for the next frame starts. In this process, the polarization state of the laser light beam 123 having passed through the liquid crystal element 131 due to the change in the orientation of the liquid crystal material of the liquid crystal element 131 and in the state perpendicular to the polarization state of the previous frame. Thus, the scanning is performed for the next frame by using the light beam 214 with the perpendicularly polarized polarization state.

As described above, according to the laser projection apparatus 101 of the embodiment, the polarization state is changed during the blanking period 145, in which no image is displayed, and the scanning is performed by using the scanning light beam 214, whose polarization state is different every frame; but the polarization state of the scanning light beam 214 is not changed during the image display period 144 of one frame. Thus, in every frame, the polarization state is different and the state of speckle is different. As a result, the speckle is reduced by multiplexing these different states of speckle, and the brightness is not changed during one frame, with the result that excellent image projection is realized. Therefore, an image quality superior to that of the conventional art is obtained.

An preferable relation between the blanking period (sec) and the frame frequency (Hz) is shown by the following relational expression.

$$0.1 < \text{blanking period (sec)} \times \text{frame frequency (Hz)} < 0.4$$

The above relational expression is a conditional expression for accomplishing both favorable reduction of speckle and favorable image projection.

In the embodiment, the blanking period is 5 ms, and the frame frequency is 60 Hz, and the formula blanking period (sec)×frame frequency (Hz) is 0.3, which satisfies the above conditional expression.

In the case of the triangular waveform (see FIG. 9), assuming the blanking period as 2 ms, and the frame frequency as 120 Hz, the formula blanking period (sec)×frame frequency (Hz) is 0.24, which satisfies the above conditional expression.

If the upper limit of the above conditional expression is exceeded, the percentage of the blanking period is too long, and the light emitting period (scanning period) is short. As a result, the brightness becomes low, or the light source having a large output has to be used. In addition, if the blanking period is long, blink (flicker) on the screen can be seen. In view of the above issues, it is not favorable for the upper limit of the above conditional expression to be exceeded.

If the lower limit of the conditional expression is exceeded, the blanking period is too short, and the response of the polarization conversion section 130 cannot follow, and the polarization conversion cannot be completed within the blanking period for some types of the liquid crystal element. As a result, the polarization is changed in the scanning period, and the polarization state is different in the screen, resulted in occurrence of unevenness in brightness for some types of screen. In addition, the drive control (a returning speed of a saw-tooth wave or a triangular waveform) in the sub-scanning direction is difficult, and it is difficult to generate a linearly driven region (where the sub-scanning is linearly performed). As a result, the image is distorted due to the speed difference in the sub-scanning direction on the screen, with the result that a favorable image cannot be projected. In view of the above issues, it is unfavorable for the lower limit of the above conditional expression to be exceeded.

Figure 5:
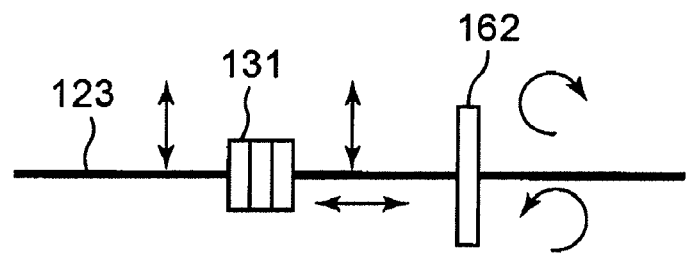
FIG. 5 is a diagram illustrating an example of change in the polarization state of the laser light beam before and after the liquid crystal element in the laser projection apparatus shown in FIG. 1.
Figure 6A:
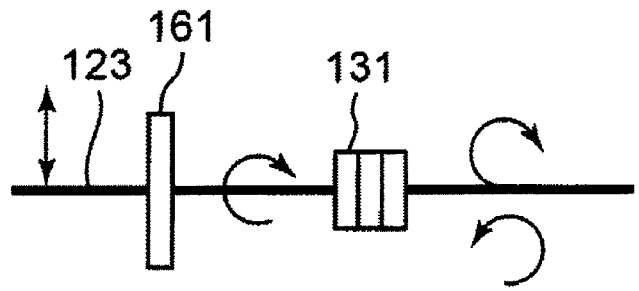
FIG. 6a is a diagram illustrating an example of the polarization state of the laser light beam before and after the liquid crystal element in the laser projection apparatus shown in FIG. 1.
Figure 6B:
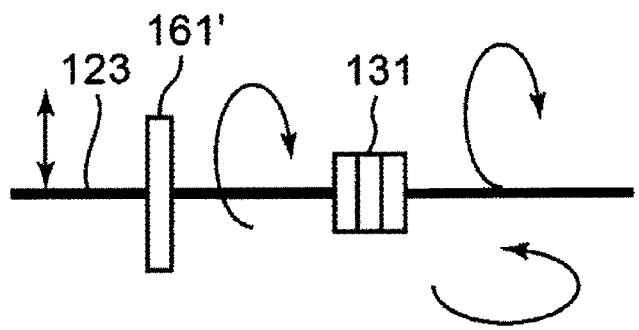
FIG. 6b is a diagram illustrating an example of the polarization state of the laser light beam before and after the liquid crystal element in the laser projection apparatus shown in FIG. 1.
Figure 7A:
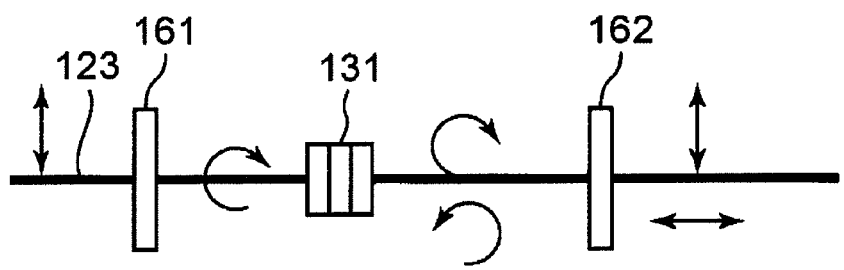
FIG. 7a is a diagram illustrating an example of the polarization state of the laser light beam before and after the liquid crystal element in the laser projection apparatus shown in FIG. 1.
Figure 7B:
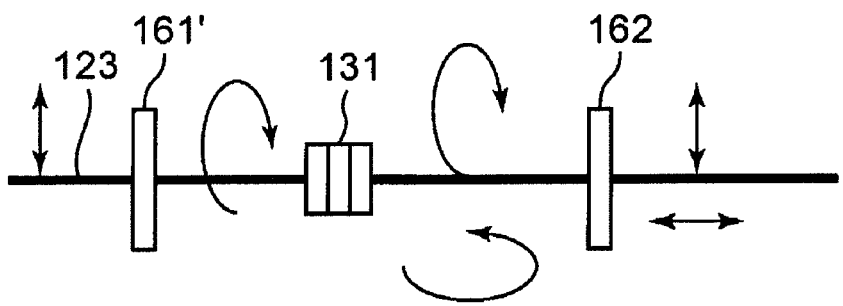
FIG. 7b is a diagram illustrating an example of the polarization state of the laser light beam before and after the liquid crystal element in the laser projection apparatus shown in FIG. 1.

In the laser projection apparatus 101 of the embodiment, the incident light entering the reflection section 141 of the scan mechanism 140 is linearly polarized as described above, but the incident light is not restricted thereto. For example, as shown in FIG. 5, there may be provided a wave plate 162 between the liquid crystal element 131 and the reflection section 141, so that the light emerging from the liquid crystal element 131 and having the linear polarization may be changed to have a circular polarization by the wave plate 162, and then enter the reflection section 141. Alternatively, as shown in FIG. 6a, the wave plate 161 may be provided between the optical system 120 and the liquid crystal element 131, and the laser light beam 123 emerging from the optical system 120 and having a linear polarization may be changed to have a circular polarization by the wave plate 161, and then enter the liquid crystal element 131. In this case, depending on the change in the orientation of the liquid crystal material of the liquid crystal element 131, the emerging light from the liquid crystal element 131 may be converted to have a right circular polarization or a left circular polarization, and then enter the reflection section 141. Alternatively, as shown in FIG. 6b, a wave plate 161' may be provided between the optical system 120 and the liquid crystal element 131, and the laser light beam 123 having a linear polarization may be changed to have a circular polarization by the wave plate 161', and then enter the liquid crystal element 131. In this case, the light emerging from the liquid crystal element 131 is converted to have a right elliptical polarization or a left elliptical polarization, and enters the reflection section 141. Further alternatively, as shown in FIG. 7a and FIG. 7b, the right circular polarization light, the left circular polarization light, the right elliptical polarization light, or the left elliptical polarization light, which have been generated in the configuration of FIG. 6a or FIG. 6b, may be linearly polarized through the wave plate 162 and enters the reflection section 141.

Figure 8:
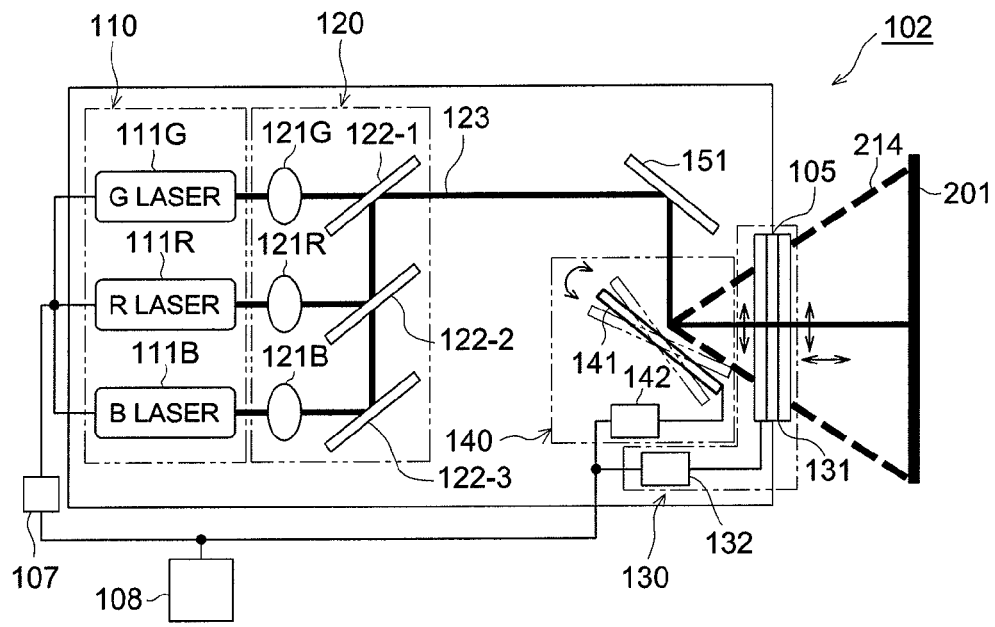
FIG. 8 is a diagram showing an example of modification of the laser projection apparatus shown in FIG. 1.

In the laser projection apparatus 101 described above, the liquid crystal element 131 is disposed between the optical system 120 and the scan mechanism 140 as shown in FIG. 1, but the liquid crystal element 131 may be disposed on the light exit side of the reflection section 141 of the scan mechanism 140 as in the laser projection apparatus 102 shown in FIG. 8. To describe it in detail, on the scanning light beam emission window of the laser projection apparatus is generally provided with a protective glass to protect the reflection section 141 of the scan mechanism 140 from dust and vibration of the air. Thus, in the laser projection apparatus 102, the liquid crystal element 131 doubles as the protective glass of the scanning light beam emission window 105. The other part of the configuration of the laser projection apparatus 102 is the same as those of the laser projection apparatus 101.

In addition, the above-described different types of modification examples can be applied to the laser projection apparatus 102.

In such laser projection apparatuses 102, since the liquid crystal element 131 doubles the protective glass, the number of components can be reduced compared to the laser projection apparatus 101.

On the other hand, the beam transmissive region is relatively small between the optical system 120 and the scan mechanism 140 compared to on the light exit side of the reflection section of the scan mechanism 140. For this reason, when the liquid crystal element 131 is disposed between the optical system 120 and the scan mechanism 140 as in the laser projection apparatus 101 shown in FIG. 1, the liquid crystal element 131 can be relatively small, whereby the laser projection apparatus 101 is small-sized compared to the laser projection apparatus 102; and in addition, the laser light beam 123, which is made up of the combined laser light beams of the three of the B (blue), R (red), and G (green), can be polarization-converted by one liquid crystal element 131, which arrangement is preferable. However, since the three laser light beams have different wavelengths, it is difficult to obtain the maximum polarization conversion effect for all different color laser light beams. Thus, it is preferable to design the liquid crystal element 131 so that it generates the maximum polarization conversion effect on the green or red laser light beam, to which a human eye has a high sensitivity.

In the configuration of the laser projection apparatus 101 (see FIG. 1) and the laser projection apparatus 102 (see FIG. 8), a so-called angular separation method in which the beam enters the scan mechanism 140 from the inclined direction so that the incident beam entering the scan mechanism 140 and the reflection beam reflected on the scan mechanism 140 are spatially separated.

On the other hand, a so-called polarization separation method can be employed, in which there are provided in the optical path in direct front of the scan mechanism 140 in order from the scan mechanism 140 side: a device (such as a ¼ wave plate) for rotating the polarization by 90 degrees in the return optical path; and a polarization beam splitter, such that the incident direction to and the reflection direction from the scan mechanism 140 is about the same. However, in the case of polarization separation method, if the liquid crystal element 131 is disposed in the optical path to the scan mechanism 140, the polarization state of the beam entering the polarization beam splitter is changed, and thus, the amount of the light directing to the scan mechanism 140 is unfavorably changed. If the polarization separation method is employed, the liquid crystal element 131 needs to be disposed in the optical path after the reflection beam from the scan mechanism 140 emerges from the polarization beam splitter.

INDUSTRIAL APPLICABILITY

The present invention can be applied to a laser projection apparatus in which a laser light beam is two-dimensionally deflected and scanned to project an image.

DESCRIPTION OF THE NUMERALS 101, 102: Laser projection apparatus
105: Scanning light beam emission window
110: Laser light source
120: Optical system
130: Polarization conversion section
131: Liquid crystal element
131a: Transmissive region
132: Drive control device
140: Scan mechanism
141: Reflection section
142: Drive section
145: Blanking period
201: Screen
214: Scanning light beam

The invention claimed is:

1. A laser projection apparatus, comprising:
a laser light source configured to generate a modulated laser light beam;
a scan mechanism configured to two-dimensionally scan the laser light beam so as to form a plurality of frames to project an image on a screen with a blanking period between each of the frames;
a polarization conversion section configured to make polarization states of the laser light beam different between the frames; and
a drive control device configured to control the polarization conversion section to hold the polarization state within the same frame and to change the polarization state during the blanking period.

2. The laser projection apparatus of claim 1, wherein the polarization conversion section includes a liquid crystal element for forming a single-polarization state in a region where the laser light beam passes through.

3. The laser projection apparatus of claim 2, wherein a liquid crystal of the liquid crystal element is a smectic liquid crystal or a ferroelectric liquid crystal.

4. The laser projection apparatus of claim 1, wherein the following conditional expression is satisfied:

0.1<blanking period (sec)×frame frequency (Hz)<0.4.

5. The laser projection apparatus of claim 4, wherein the polarization conversion section is disposed between the laser light source and the scan mechanism.

6. The laser projection apparatus of claim 4, comprising:
a light beam emission window which is provided on a light emission side of the scan mechanism and through which the laser light beam passes,
wherein the polarization conversion section is provided at the light emission window.

7. The laser projection apparatus of claim 4, wherein the polarization conversion section causes the laser light beam to have polarization states perpendicular to each other between the frames.

8. The laser projection apparatus of claim 4, wherein the laser light source includes a plurality of laser light sources configured to emit laser light beams each of which has a different wavelength, and wherein the laser projection apparatus comprises an optical system configured to combine the laser light beams from the plurality of laser light sources.

9. The laser projection apparatus of claim 8, wherein each of the plurality of laser light sources generates a blue laser light beam, a green laser light beam, and a red laser light beam, respectively, and the polarization conversion section is configured to convert polarization of the green laser light beam or the red laser light beam to have polarization states perpendicular to each other between the frames.

10. The laser projection apparatus of claim 8, wherein the polarization conversion section is disposed between the optical system and the scan mechanism.

11. The laser projection apparatus of claim 1, wherein the polarization conversion section is disposed between the laser light source and the scan mechanism.

12. The laser projection apparatus of claim 1, comprising:
a light beam emission window which is provided on a light emission side of the scan mechanism and through which the laser light beam passes,
wherein the polarization conversion section is provided at the light emission window.

13. The laser projection apparatus of claim 1, wherein the polarization conversion section causes the laser light beam to have polarization states perpendicular to each other between the frames.

14. The laser projection apparatus of claim 1,
wherein the laser light source includes a plurality of laser light sources configured to emit laser light beams each of which has a different wavelength, and wherein the laser projection apparatus comprises an optical system configured to combine the laser light beams from the plurality of laser light sources.

15. The laser projection apparatus of claim 14, wherein each of the plurality of laser light sources generates a blue laser light beam, a green laser light beam, and a red laser light beam, respectively, and the polarization conversion section is configured to convert polarization of the green laser light beam or the red laser light beam to have polarization states perpendicular to each other between the frames.

16. The laser projection apparatus of claim 14, wherein the polarization conversion section is disposed between the optical system and the scan mechanism.

* * * * *